UNITED STATES PATENT OFFICE.

ARTHUR GEORGE GREEN AND THOMAS ATKINSON LAWSON, OF LONDON, ENGLAND, ASSIGNORS TO BROOKE, SIMPSON & SPILLER, LIMITED, OF SAME PLACE.

RED AZO DYE.

SPECIFICATION forming part of Letters Patent No. 500,762, dated July 4, 1893.

Application filed July 14, 1892. Serial No. 439,962. (Specimens.)

*To all whom it may concern:*

Be it known that we, ARTHUR GEORGE GREEN and THOMAS ATKINSON LAWSON, chemists to the firm of Brooke, Simpson & Spiller, Limited, of London, England, aniline-dye manufacturers, subjects of the Queen of Great Britain and Ireland, residing at Atlas Works, Hackney Wick, London, in the county of Middlesex, England, have invented certain new and useful Improvements in the Manufacture of Azo Coloring-Matters, of which the following is a specification.

Our invention relates to the manufacture of a red coloring matter, which dyes wool from an acid bath and withstands the action of milling and scouring to a very remarkable extent. We obtain this color by treating the azoxytoluidin, which melts at 168° centigrade, and has the chemical formula

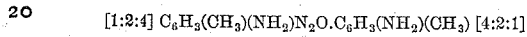

with nitrous acid, and combining the tetrazo compound, so obtained, with one molecule of alpha-naphthol-para-sulfonic acid and one molecule of beta-naphthol-di-sulfonic acid R. The azoxytoluidin employed was first obtained by Limpricht in 1885 (see *Berichte der Deutschen Chemischen Gesellschaft*, v. 18, p. 1403).

The following is an example of the process for preparing the said coloring matter: A solution of fourteen pounds of sodium nitrite (ninety-six per cent.) in twenty gallons of water, is added slowly to an iced solution of twenty-five and one-half pounds of the aforesaid azoxytoluidin in one hundred gallons of water, containing four and one-half gallons of hydrochloric acid thirty-one per cent. The solution of the tetrazo compound, thus obtained, is then added to a solution containing twenty-five pounds of sodium alpha-naphthol-para-sulphonate, and about twenty pounds of crystallized sodium acetate in one hundred gallons of water. A solution of thirty-five pounds of sodium beta-naphthol-di-sulfonate R., and twenty-four pounds of commercial anhydrous sodium carbonate or its equivalent in ordinary crystallized soda in one hundred gallons of water is then run in. The insoluble intermediate compound, which had first formed, dissolves, as the combination takes place, and when the solution, which has throughout been well agitated, becomes quite clear, the coloring matter is precipitated from its solution by the addition of common salt, filtered off and dried. The coloring matter so obtained is in the form of a dark red powder which is easily soluble in water, but is insoluble in alcohol. The addition of caustic soda or potash to the aqueous solution changes the red color to an orange red. Dilute acids do not precipitate the solution. The color itself dissolves in concentrated sulfuric acid with a bluish red color. In an acidified bath it dyes woolen goods a bright red, closely approaching in shade cochineal scarlet. The dye thus used resists the action of soap and alkali as used in milling or domestic washing, in a remarkable manner. The dyed goods are not altered in color by the action of acids.

Having now described our invention, what we claim, and desire to secure by Letters Patent, is—

1. The herein described process for the preparation of a coloring matter, consisting in the treatment of azoxytoluidin of melting point 168° centigrade, with nitrous acid, and combining the tetrazo compound thus obtained with one molecule of alpha-naphthol-para-sulfonic acid and one molecule of beta-naphthol-di-sulfonic acid R. and finally precipitating the coloring matter, substantially as described.

2. As a new article of manufacture, a coloring matter, derived from azoxy toluidin and consisting of a dark red powder, easily soluble in water but insoluble in alcohol, the addition of caustic soda or potash to such aqueous solution changing the red color to orange red, said solution not capable of precipitation by dilute acids, said color dissolving in concentrated sulfuric acid with a bluish red color, dyeing woolen goods in an acid bath a bright red, resisting the action of soap and alkali in milling and washing and not altered in color by the action of acids, substantially as described.

ARTHUR GEORGE GREEN.
THOMAS ATKINSON LAWSON.

Witnesses:
R. J. FISWELL,
H. OUGHTERSON HAYMEN.